United States Patent [19]
Wakai et al.

[11] Patent Number: 5,430,560
[45] Date of Patent: Jul. 4, 1995

[54] THREE-DIMENSIONAL IMAGE DISPLAY DEVICE

[75] Inventors: Hideyuki Wakai; Toru Suzuki; Keiji Terada; Masato Moriya; Manabu Ando, all of Hiratsuka, Japan

[73] Assignee: Kabushiki Kaisha Komatsu Seisakusho, Tokyo, Japan

[21] Appl. No.: 165,325

[22] Filed: Dec. 13, 1993

[30] Foreign Application Priority Data

Dec. 18, 1992 [JP] Japan .................. 4-338915

[51] Int. Cl.⁶ .................. G03H 1/22; G03H 1/30
[52] U.S. Cl. .................. 359/17; 359/18; 359/22; 359/23; 359/32
[58] Field of Search .............. 359/17, 18, 22, 23, 359/25, 26, 32, 33

[56] References Cited

U.S. PATENT DOCUMENTS

| | | |
|---|---|---|
| 3,547,510 | 12/1970 | DeBitetto .................. 359/26 |
| 3,608,993 | 9/1971 | DeBitetto .................. 359/23 |
| 3,627,916 | 12/1971 | Bestenreiner et al. .................. 359/26 |
| 3,636,838 | 1/1972 | Chang et al. .................. 359/26 |
| 3,698,787 | 10/1972 | Mueller et al. .................. 359/26 |
| 3,746,783 | 7/1973 | Gerritsen et al. .................. 359/26 |
| 3,838,903 | 10/1974 | Leith et al. .................. 359/26 |
| 3,842,197 | 10/1974 | Broussaud et al. .................. 359/26 |
| 3,914,544 | 10/1975 | Watanabe et al. .................. 359/26 |

FOREIGN PATENT DOCUMENTS 4-33174  2/1992  Japan .

*Primary Examiner*—Martin Lerner
*Attorney, Agent, or Firm*—Diller, Ramik & Wight

[57] ABSTRACT

A three-dimensional image display device which comprises a light source; a hologram divided into a plurality of divided areas and exposed so that point images are formed at different positions in a three-dimensional space in the respective divided areas when the light from the light source is irradiated; a hologram driver unit for driving the hologram such that light from the light source is selectively entered into one of the plurality of divided areas and; a control unit for controlling the lighting up of the point images formed in the three-dimensional space in correspondence to a three-dimensional image signal by controlling the hologram and the light source in accordance with the three-dimensional image signal to be displayed, whereby a three-dimensional image is obtained by the hologram with the simple-configured device.

5 Claims, 3 Drawing Sheets

THREE-DIMENSIONAL IMAGE DISPLAY DEVICE

BACKGROUND OF THE INVENTION

1. Field of the Invention

This invention relates to a three-dimensional image display device which displays a dynamic solid image using a hologram.

2. Description of the Related Art

Mechanical CADs generally use a three-sided figure and two-dimensional projection for displaying a shape of a three-dimensional object. It is, however, rather difficult to accurately recognize a complicated shape from a two-dimensional projected image. In order to observe an object in various directions in three-dimensional computer graphics, the image must be rotated on a display screen and hence it is difficult to grasp a whole image spatially.

A three-dimensional solid image is more preferable than a two-dimensional one to visualize the result of simulation of fluid or to display the shapes of bones and blood vessels on the basis of an ultrasonic diagnosis image or a CT (Computed Tomography) image. The formation of a dynamic solid image is desired to obtain an ambience even in the field of solid images.

Conventionally, a binocular solid display process is used usually to display a three-dimensional solid image. The binocular solid display process is to provide different images for the right and left eyes to obtain an image having a depth. When observing two objects different in depth with both eyes, the positions of the two object images formed on the retinas of right and left eyes deviate in proportion to the difference in distance between the objects. This quantity of deviation between the object images is called a binocular vision difference. When two dynamic or still images which contain information on the binocular vision difference are displayed, only image components for the right and left eyes are separately observed using a pair of special purpose glasses which uses a difference in color or polarization or a special display screen including an array of miniature optical elements, and a solid space is reproduced before and after the screen.

The binocular solid display process, however, reproduces a solid space with the binocular parallax alone on the basis of observation in one direction.

Thus, there are the following problems:

1) Information obtained in other directions is so insufficient that a change in the image depending on the position of the observation does not occur;

2) The device cannot be focused on an object which the observer wants to view;

3) Since the position of the image reproduction differs from that on the screen, focus adjustment is a process which is not encountered in daily life; and 4) Since the images which we view with our right and left eyes are different, we feel a sensation of incompatibility.

A holography display process has recently been marked as means for solving such problems. The holography is a technique for storing and reproducing both the amplitude and phase of an optical wave in a plane, so that even when a view point is moved vertically and horizontally, a three-dimensional image from different angles can be seen. Because all of physiological factors required for recognizing a solid object, the binocular vision difference, the congestion and the eye adjustment hold, the hologram can be more natural three-dimensional image than that obtained by the other methods. The hologram is produced by storing interference fringes occurring as a result of interference of optical waves called object light from an object and different optical waves called reference light coming from a different direction. When the reference light is entered into the hologram, the light is diffracted by interference fringes in the hologram so that the wave front same with the original object light is formed and thus an object image appears in the space.

However, the conventional holography display requires one hologram for each subject (image). Thus, while a solid (still) image has a very high solid property, a large amount of hologram is required and the device structure is very complicated when a dynamic image hologram is displayed.

SUMMARY OF THE INVENTION

This invention is made in view of such situation. It is an object of the present invention to provide a simple, structured three-dimensional image display device capable of obtaining a three-dimensional hologram image.

To achieve the above object, the present invention provides a three-dimensional image display device which comprises a light source; a hologram including a plurality of divided areas and exposed such that point images are formed at different positions in a three-dimensional space in the respective areas when the plurality of divided areas are irradiated with light from the light source; a hologram driver for driving the hologram such that light from the light source enters one of the plurality of divided areas selectively; and control means for controlling the lighting up of the point images formed in the three-dimensional space in correspondence to a three-dimensional image signal by controlling the hologram and the light source in accordance with the three-dimensional image signal to be displayed.

According to the present invention, the hologram is driven such that point images in a three-dimensional space are lighted up in a time series in correspondence to an image signal. Thus, if a plurality of point images are lighted up in the after-image time of a human being, a three-dimensional solid image is observed by the human being's eyesight.

A dynamic image is obtained by moving an image to be produced in each after-image time. Thus, according to the present invention, if point images in the three-dimensional space are lighted up in a time series in correspondence to the image signal, various three-dimensional images are displayed using a small amount of hologram and a simple control structure.

DESCRIPTION OF THE PREFERRED EMBODIMENTS

The present invention will be described in detail in terms of embodiments thereof shown in the attached drawings.

Figure 1:
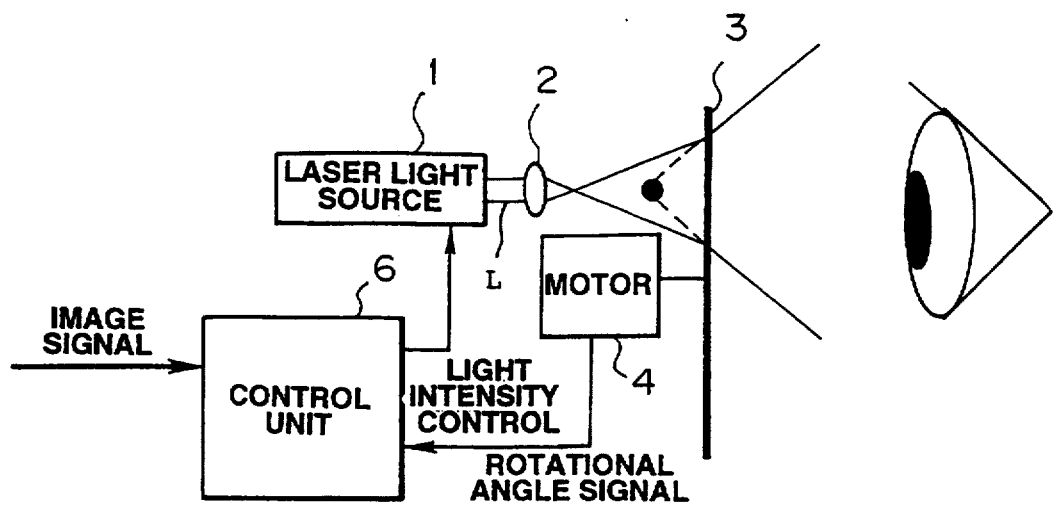
FIG. 1 shows an embodiment of the present invention.

FIG. 1 shows an embodiment of the present invention. A laser beam L emitted from a laser beam source 1 is expanded by a lens 2 to enter as reference light into a predetermined area of a hologram 3, which is arranged to be rotated by a motor 4.

Figure 2:
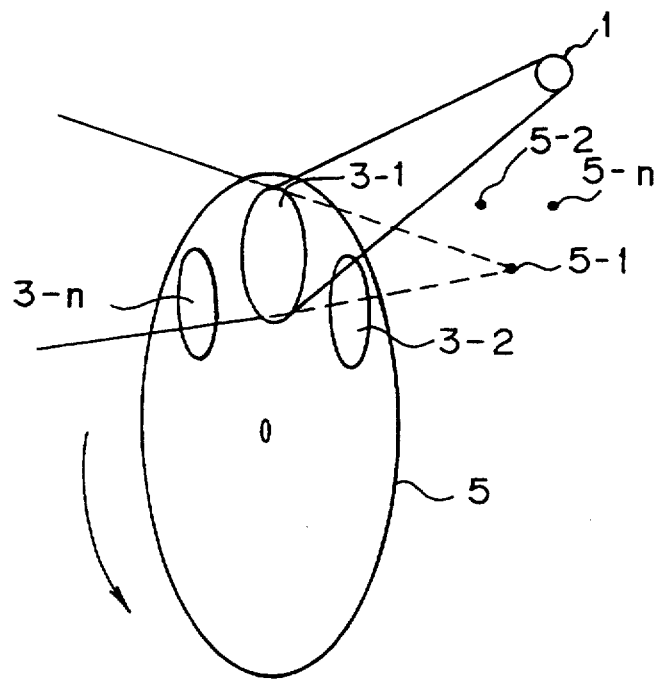
FIG. 2 illustrates an aspect of exposure to a hologram.

In this case, as shown in FIG. 2, the hologram 3 uses a plurality of holograms 3-1, 3-2, . . . , 3-n bonded to a disc 5. The respective holograms 3-1, 3-2, . . . , 3-n are exposed so as to reproduce virtual images 5-1, 5-2, . . . , 5-n of the point sources at different positions in the three-dimensional space when the light of the laser light source 1 enters the hologram.

Figure 3:
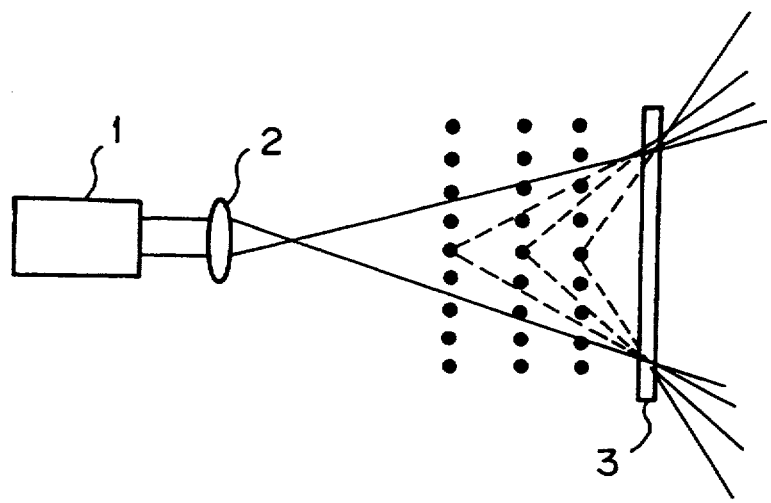
FIG. 3 shows a group of virtual images of point sources reproduced by a hologram.

Thus, when the hologram disc 5 is rotated by the motor 4, the laser light is cast sequentially as the reference light on the respective holograms 3-1, 3-2, . . . , 3-n. As a result, virtual images of the point sources are sequentially reproduced at different positions in the three-dimensional space. Thus, as shown in FIG. 3, if the respective holograms 3-1, 3-2, . . . , 3-n are exposed such that the virtual images of the point sources are disposed, for example, with high density in the form of a rectangular matrix in the three-dimensional space, any particular one of those virtual images of the point sources in the form of a matrix is selected and displayed as required to thereby reproduce an image conforming to a desired image signal. If all the virtual images are lighted up, a rectangular box is displayed as if it floated in the space.

Figure 4:
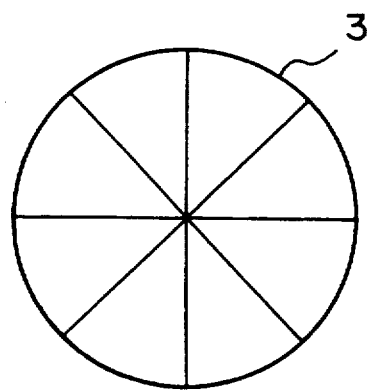
FIG. 4 shows division of a hologram.

Also, when the respective disc areas of the hologram 3 divided in accordance with the rotational angle, as shown in FIG. 4, are subjected to exposure, an equivalent function is achieved.

The control unit 6 of FIG. 1 receives an image signal indicative of whether the virtual point images arranged in the form of a matrix are lighted up and a signal indicative of the rotational angle of the hologram disc, and recognizes a virtual point image displayed at the current time in accordance with the signal indicative of the rotational angle of the hologram disc and whether that virtual point images should be displayed in accordance with the image signal. Thus, the laser light source 1 is controlled such that when the virtual point image is to be displayed, the light source 1 is lighted up, and that if otherwise, the source 1 is not lighted up. Such control of lighting is provided synchronously with the rotational control of the hologram disc.

By providing that series of controlling operations in the after-image time of a human being, the three-dimensional display of a desired object is provided in accordance with the image signal. A dynamic image is obtained by moving an image to be created in each after-image time.

Figure 5:
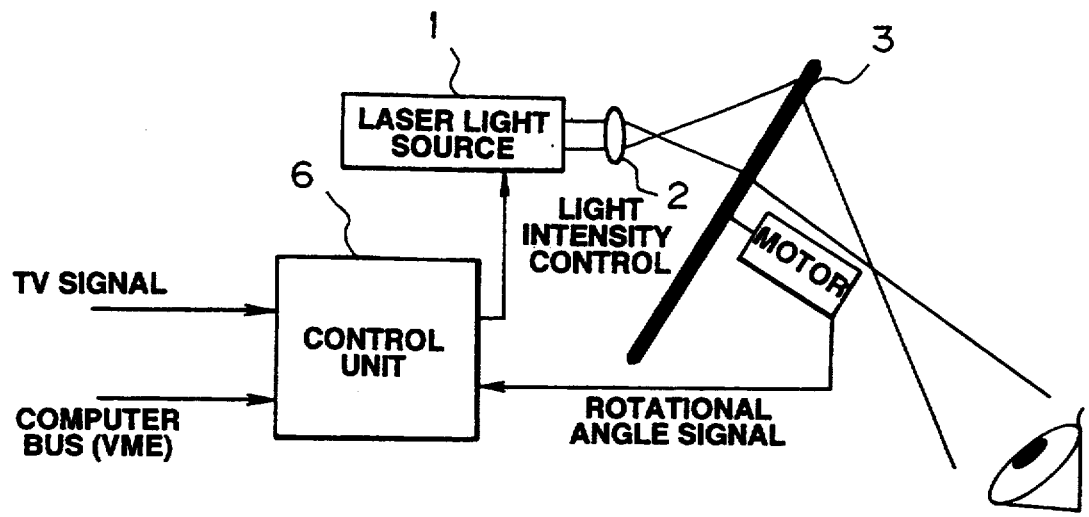
FIG. 5 shows another embodiment of the present invention.

FIG. 5 shows another embodiment of the present invention which is concerned with reproduction of a real image of a point source by the light source 1 and not with reproduction of a virtual point image of a point source as is in the previous embodiment.

In the case of the present embodiment, the control unit 6 receives a television (TV) signal (RS-170) and is connected to a computer bus such as VME such that the computer sends required information to the control unit 6.

The TV signal indicates (x, y) coordinates in a time series in accordance with horizontal and vertical synchronous signals and contains information on brightness and color for each coordinate. In this case, the brightness information is replaced with information on height (in the z-direction), and the color information is replaced with information on the brightness to facilitate the connection of the present device to a general TV device. Since in this case the information on the color is not used, a three-dimensional monochromatic image is provided. Since in the TV signal only one z position can be obtained for one set of x and y coordinates, the resulting image may be an image floating in the space like a cut-figured picture. Thus, the control unit 6 is connected to the computer bus such as VME so as to receive required information from a computer.

Figure 6A:
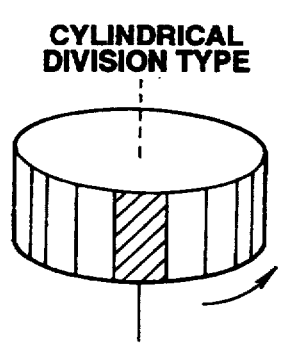
FIGS. 6(a) and 6(b) show another division exposure systems.
Figure 6B:
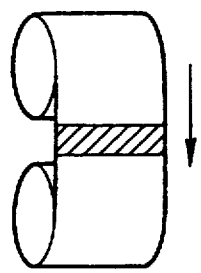

FIGS. 6(a) and 6(b) show division and exposure of a hologram 3 directed to a cylindrical division type and a film division type. In the case of the cylindrical division type, the hologram is rotated around its central axis while in the case of the film type the film winding shaft is rotated to move the film.

What is claimed is:

1. A three-dimensional image display device comprising:
    a hologram having a plurality of divided areas, each of the divided areas being exposed so that point images at different positions in a three-dimensional dot matrix are formed when a reproduced light is irradiated;
    a light source for irradiating the reproduced light to one of the divided areas of the hologram;
    hologram driver means for driving the hologram so that the reproduced light from the light source is sequentially irradiated to each of the divided areas of the hologram; and
    lighting control means for controlling the lighting up of the light source in synchronism with the driving of the hologram in accordance with a three-dimensional image signal indicative of ON and OFF of each dot of the three-dimensional dot matrix to thereby form an aggregation of the reproduced point images corresponding to the three-dimensional image signal.

2. The three-dimensional image display device according to claim 1 wherein the divided areas of the hologram are divided by rotational angles of the hologram and wherein the hologram driver means rotates the hologram.

3. The three-dimensional image display device according to claim 1 wherein the divided areas of the hologram are juxtaposed in one direction and wherein the hologram driver means slidingly moves the hologram.

4. The three-dimensional image display device according to claim 1 wherein the point image formed by the hologram is an imaginary image.

5. The three-dimensional image display device according to claim 1 wherein the point image formed by the hologram is a real image.

* * * * *